US006976265B1

(12) United States Patent
Yang et al.

(10) Patent No.: US 6,976,265 B1
(45) Date of Patent: Dec. 13, 2005

(54) METHOD AND APPARATUS FOR CONTROLLING DISPLAY OF CONTENT SIGNALS

(75) Inventors: Ivan Yang, Markham (CA); Stephen Orr, Markham (CA); Andrew Morrison, Toronto (CA)

(73) Assignee: ATI International Srl, Christchurch (BB)

( * ) Notice: Subject to any disclaimer, the term of this patent is extended or adjusted under 35 U.S.C. 154(b) by 0 days.

(21) Appl. No.: 09/169,023

(22) Filed: Oct. 8, 1998

(51) Int. Cl.$^7$ ............... H04N 7/167; H04N 7/16
(52) U.S. Cl. ............... 725/31; 725/136; 725/139; 725/142
(58) Field of Search ............... 725/9, 10, 25, 725/31, 136, 139, 142; 380/210, 211, 212, 380/200–203, 236, 237, 240; 713/200

(56) References Cited

U.S. PATENT DOCUMENTS

| | | | |
|---|---|---|---|
| 4,225,884 A | | 9/1980 | Block et al. |
| 4,322,745 A | * | 3/1982 | Saeki et al. ............... 380/242 |
| 4,528,589 A | * | 7/1985 | Block et al. ............... 380/241 |
| 4,599,646 A | | 7/1986 | Cottam |
| 4,605,961 A | * | 8/1986 | Frederiksen |
| 4,605,964 A | | 8/1986 | Chard et al. |
| 4,739,510 A | * | 4/1988 | Jeffers et al. ............... 380/234 |
| 4,794,474 A | | 12/1988 | Dwyer et al. |
| 4,888,796 A | | 12/1989 | Olivo et al. |
| 4,905,278 A | | 2/1990 | Parker |
| 4,908,834 A | * | 3/1990 | Wiedemer ............... 380/228 |
| 4,932,874 A | | 6/1990 | Hollopeter et al. |
| 5,060,262 A | | 10/1991 | Bevins, Jr et al. |
| 5,172,111 A | | 12/1992 | Olivo et al. |
| 5,410,601 A | * | 4/1995 | Hashimoto ............... 380/215 |
| 5,434,678 A | | 7/1995 | Abecassis |
| 5,550,575 A | * | 8/1996 | West et al. ............... 725/25 |
| 5,579,391 A | | 11/1996 | Ihara |
| 5,584,060 A | | 12/1996 | Herrmann et al. |
| 5,588,058 A | | 12/1996 | Le Berre |
| 5,589,945 A | | 12/1996 | Abecassis |
| 5,634,849 A | | 6/1997 | Abecassis |
| 5,710,815 A | * | 1/1998 | Ming et al. |
| 5,724,472 A | | 3/1998 | Abecassis |
| 5,784,013 A | | 7/1998 | Burgard |
| 5,850,249 A | * | 12/1998 | Massetti et al. |
| 5,917,915 A | * | 6/1999 | Hirose |
| 5,920,626 A | * | 7/1999 | Durden et al. ............... 380/210 |
| 5,973,683 A | * | 10/1999 | Cragun et al. |
| 6,008,737 A | | 12/1999 | Deluca et al. |
| 6,037,969 A | * | 3/2000 | Lim et al. ............... 725/25 |

(Continued)

OTHER PUBLICATIONS

Transport of Content Advisory Information using Extended Data Services, EIA Standard, Oct., 1997.

(Continued)

*Primary Examiner*—Kieu-Oanh Bui
(74) *Attorney, Agent, or Firm*—Vedder, Price, Kaufman & Kammholz, P.C.

(57) ABSTRACT

A method and apparatus for controlling display of content signals begins by receiving a content signal that includes video content and at least one associated content control indicator. The content signal may also include audio content associated with the video content. The processing continues by comparing the at least one associated content control indicator (e.g., a rating of mature subject matter of the content signal) with at least one content control setting (e.g., a parental setting based on allowable viewing of rated content signals). When the associated content indicator compares unfavorably to the content control setting, a video graphics processor scrambles the at least a portion of the video content. The scrambled video content is then provided to a video rendering device for subsequent display.

22 Claims, 5 Drawing Sheets

U.S. PATENT DOCUMENTS

| | | | |
|---|---|---|---|
| 6,052,506 A * | 4/2000 | Fukushima et al. | 386/46 |
| 6,067,401 A | 5/2000 | Abecassis | |
| 6,072,872 A * | 6/2000 | Chang et al. | |
| 6,078,666 A | 6/2000 | Murakami | |
| 6,091,822 A * | 7/2000 | Mellows et al. | 380/210 |
| 6,115,057 A * | 9/2000 | Kwoh et al. | 725/25 |
| 6,216,228 B1 * | 4/2001 | Chapman et al. | |
| 6,226,794 B1 | 5/2001 | Anderson, Jr. et al. | |
| 6,337,947 B1 | 1/2002 | Porter et al. | |
| 6,347,400 B1 * | 2/2002 | Ohkura et al. | 725/60 |
| 6,381,332 B1 | 4/2002 | Glaab | |
| 6,477,179 B1 * | 11/2002 | Fujii et al. | 370/466 |
| 6,529,526 B1 * | 3/2003 | Schneidewend | 370/486 |
| 6,636,607 B1 * | 10/2003 | Yang et al. | 381/2 |

OTHER PUBLICATIONS

"V-Chip Solutions-Parental Guide", Copyright 1998, Parental Guide.

* cited by examiner

METHOD AND APPARATUS FOR CONTROLLING DISPLAY OF CONTENT SIGNALS

TECHNICAL FIELD OF THE INVENTION

This invention relates generally to video and audio processing systems and more particularly to controlling display of video signals and/or audio signals.

BACKGROUND OF THE INVENTION

The entertainment industry is producing an ever-increasing number of video and/or audio products for private and public use. Today, a consumer may rent or purchase a movie in a videocassette format, a laser disk format, a DVD format, etc. In addition, the user may view a movie via a television broadcast, cable broadcast, and/or satellite broadcast. Similarly, for audio products, a consumer may purchase audio-cassettes. CDs, or sound tracks or listen to radio and/or satellite audio broadcasts. In addition to the numerous sources of audio and/or video materials, the content of such merchandise is more explicit than in the past. As such, the debate over how, and who, should censor such material is increasing.

The U.S. movie industry has addressed the censorship issue by providing ratings to the movies it produces based on the audio and/or video content. Such ratings include: G indicating that the content is acceptable for general audiences, PG indicating that parental guidance is suggested because some of the content may be too mature for all persons; PG-13 indicating that the movie may be inappropriate for children under 13; R indicating that the movie is restricted such that no one under the age of 17 may view the movie in a theater without his or her parents; R-17 indicating the no one under the age of 17 is allowed to view the movie in a theater, and X indicating the content is explicitly for adults. Based on these ratings, parents and/or guardians may monitor the movies in which they allow their children to view at a movie theater. While the rating system works fairly well to restrict younger viewers from viewing inappropriate movies at public theaters, it only provides guidance to parents and/or guardians for publicly displayed movies.

With the increased number of sources for providing audio and/or video content into the home, such as cable, satellite, VCR tapes, laser disks, DVD disks, etc., the challenge to monitor a child's viewing choices is becoming an increasingly difficult task. To address this issue, the United States has undertaken a quest to establish a standard that would enable a parent to automatically restrict their children's viewing. Such a standard revolves around parental control technology. In essence, parental control technology allows a parent to enable a video and/or audio source receiver (e.g., a video cassette player, television, cable box, satellite receiver, etc.) to restrict the showing of movies that the parent has deemed inappropriate. As such, the parent can set a parental control device to any desired level of censoring.

The parental control regulation, as issued by the United States, has established that at least a portion of manufactured video and/or audio source receivers shall be equipped with the parental control technology, ramping up to full compliance over the next few years. Thus, any manufacturer that produces a video and/or audio source receiver, which includes computers equipped with a video tuner and/or encoder, must be compliant with this standard.

Therefore, a need exists for a method and apparatus that enables a computer that is capable of presenting video, audio and/or text information to be compliant with the parental control standard.

DETAILED DESCRIPTION OF A PREFERRED EMBODIMENT

Generally, the present invention provides a method and apparatus for controlling display of content signals. Such processing begins by receiving a content signal that includes video, audio, and/or text content and at least one associated content control indicator. Note that a separate content control indicator may accompany video, audio, and text portions of the content signal. The processing continues by comparing the at least one associated content control indicator (e.g., a rating of mature subject matter of the content signal) with at least one content control setting (e.g., a parental setting based on allowable viewing of rated content signals). When the associated content indicator compares unfavorably to the content control setting, a video graphics processor scrambles the at least a portion of the video content. The scrambled video content is then provided to a video rendering device for subsequent display. With such a method and apparatus, a video graphics controller and/or personal computer may provide parental control regarding content signals that include video, audio, and/or text content, from being displayed and/or recorded with objectionable mature content. By utilizing the content control setting, a user may set individual settings based on his or her preferences and the level of censoring that he or she desires for his or her children.

Figure 1:
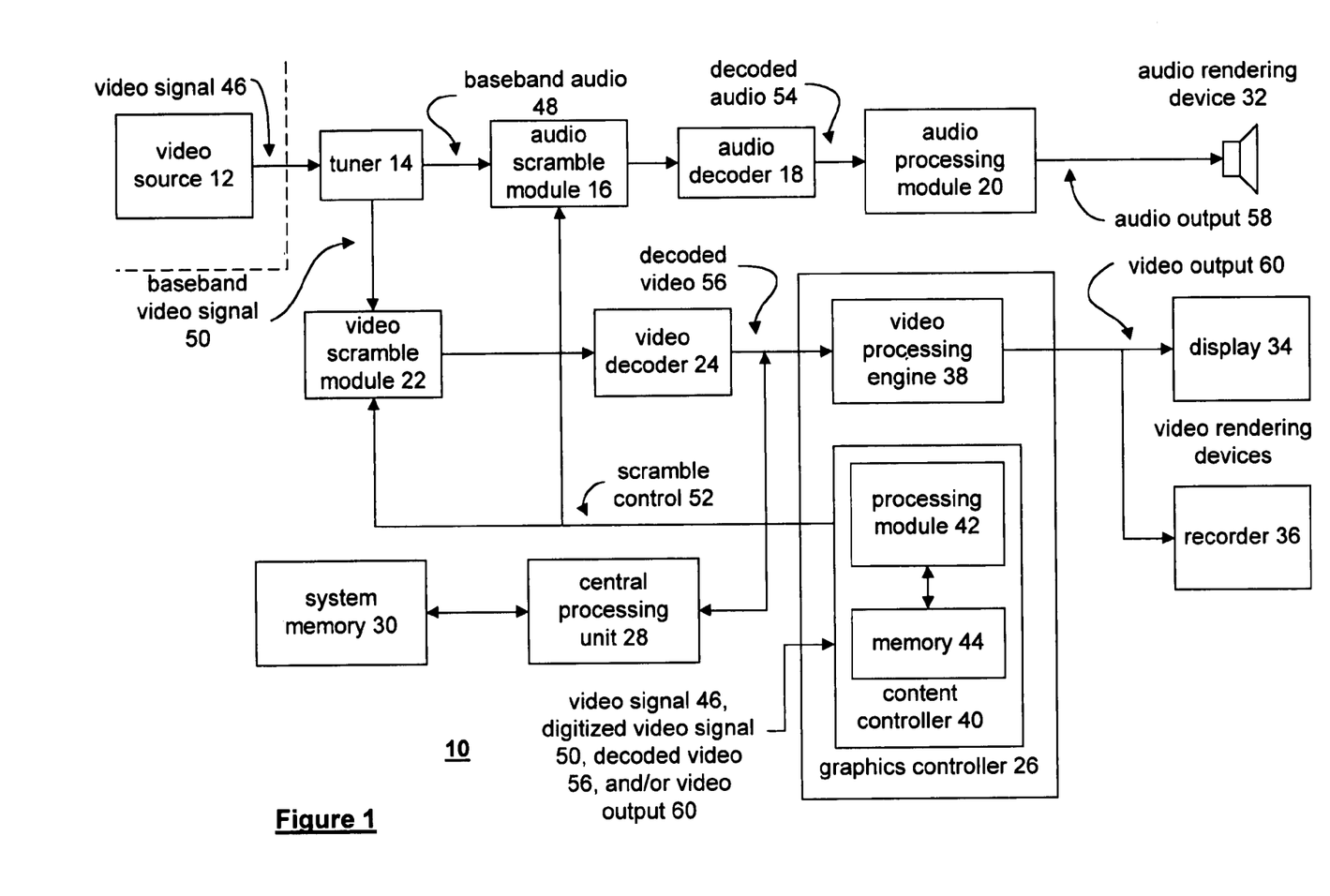
FIG. 1 illustrates a schematic block diagram of a computing system in accordance with the present invention.

The present invention can be more fully described with reference to FIGS. 1 through 5. FIG. 1 illustrates a schematic block diagram of a computing system 10 in accordance with the present invention. The computing system 10 may be a personal computer, a cable box, television, satellite receiver, DVD player, VCR player, video game, etc. The computing system 10 includes a tuner 14, an audio scrambler module 16, an audio decoder 18, an audio processing module 20, a video scramble module 22, a video decoder 24, a graphics controller 26, a central processing unit 28, and system memory 30. The computer system 10 is operably coupled to receive content signals 46 from a video source 12 and is further operably coupled to an audio rendering device 32 and a video rendering device, such as a display 34 and/or a recorder 36. The video source may be a VCR player, DVD player, television broadcast, cable broadcast, satellite broadcast, laser disk player and/or any device that sources text content, video content and/or audio content to the computing system 10.

The content signal includes video, audio, and/or text content and at least one content control indicator. If the content signal includes a single content control indicator, the content control indicator applies to the entire content. For example, if the content control indicator is set to a movie rating of R, the entire content (video, audio, and/or text) will be based on this rating. Alternatively, the content signal may include a plurality of content control indicators associated with various segments of video, text, and/or audio content. In this case, the content control indicator only regulates the corresponding portion of the video, text, and/or audio content. As such, the content signal is selectively controlled and/or censored by the associated content control indicator.

The tuner 14, which may be a tuner as found in ATI Technologies, Inc.'s All-in-Winder board, receives the content signal 46 and separates the video content and audio content producing a baseband audio signal 4 and a baseband video signal 50. The audio scramble module 16 receives the baseband audio signal and scrambles the baseband audio signal as indicated by the scramble control signal 52. Similarly, the video scramble module 22 receives the baseband video signal 50 and scrambles it based on the scramble control signal 52.

The graphics controller 26 generates the scramble control signal 52 via a content controller 40. The content controller 40 includes a processing module 42 and memory 44. The processing module 42 may be a single processing entity or a plurality of processing entities. Such a processing entity may be a microprocessor, microcontroller, microcomputer, central processing unit, digital signal processor, video graphics processor, state machine, logic circuitry, and/or any device that manipulates digital information based on programming and/or operational instructions. The memory 44 may be a single memory device or a plurality of memory devices. Such a memory device may be a read only memory device, random access memory, floppy disk, hard drive memory, external memory, magnetic tape memory, DVD memory, CD memory, and/or any device that stores operational and/or programming instructions. Note that if the processing module implements one or more of its functions via a state machine or logic circuitry the operational instructions stored in memory are embedded within the circuitry comprising the state machine and/or logic circuitry. The operational instruction stored in memory 44 and executed by processing module 42 will be discussed in greater detail with reference to FIG. 5.

In general, the content controller 40 receives and/or monitors the video signal 46, the baseband video signal 50, the decoded video signal 56 and/or the video output 60 to detect the content control indicator. Typically, the content controller 40 monitors the baseband video signal for the content control indicator, however, any other of these signals may be used to detect the content control indicator. As one of average skill in the art would appreciate, if the video output 60 is used to monitor for the content control indicator, a delay mechanism would need to be employed in the content controller to properly delay the associated video and/or audio content.

The audio scramble module 16 and the video scramble module 22 are operable to scramble the respective baseband audio signals 48 and the baseband video signals 50 when the scramble control signal 52 is active. When the scramble control signal 52 is not active, the audio scramble module 16 and video scramble module 22 pass their respective signals unaltered.

The audio decoder 18 is operably coupled to receive the output from the audio scramble module 16. The audio decoder 18 produces a decoded audio signal 54, which is typically in an analog format, and provides it to an audio processing module 20. The audio decoder 18 may be the type found in ATI Technology's All-in-Wonder board. The audio processing module 20 receives a decoded audio signal, which may be the original audio content or scrambled audio content, and produces an audio output 58 therefrom. The audio processing module 20 may be a sound card as found in computers. The output signal 58 is provided to an audio rendering device 32, which may be an analog-to-digital SPDIF, a speaker or plurality of speakers, and renders the audio output 58 audible. As such, in the audio path, if the content controller 40 detects the content control indicator and determines it exceeds a content control setting, the associated portion of the audio content will be scrambled thereby providing control over the level of explicit content that will be rendered audible.

The video decoder 24, which may be of the type found in ATI Technology's All-in-Wonder board, receives the output from the video scramble module 22 and produces decoded video 56 therefrom. The decoded video is provided to a video processing engine 38 of the graphic controller 26 and may also be received by the central processing unit 28 (e.g., record the decoded video). The central processing unit 28 may process the decoded content signal by storing it in the system memory 30 or in another memory device associated with the computing system 10. The video processing engine 38 receives the decoded video 56 which may include the original video content or a scrambled representation thereof, and produces a video output 60. The video output is provided to the video-rendering device, which may be a display 34 and/or a recorder 36. As such, the content controller 40, when the content control indicator associated with the content signal exceeds the content control setting, controls associated portions of the video content or the entire video content by scrambling the baseband video signal 50 or the decoded video 56. As such, a parental control is provided for video content.

Figure 2:
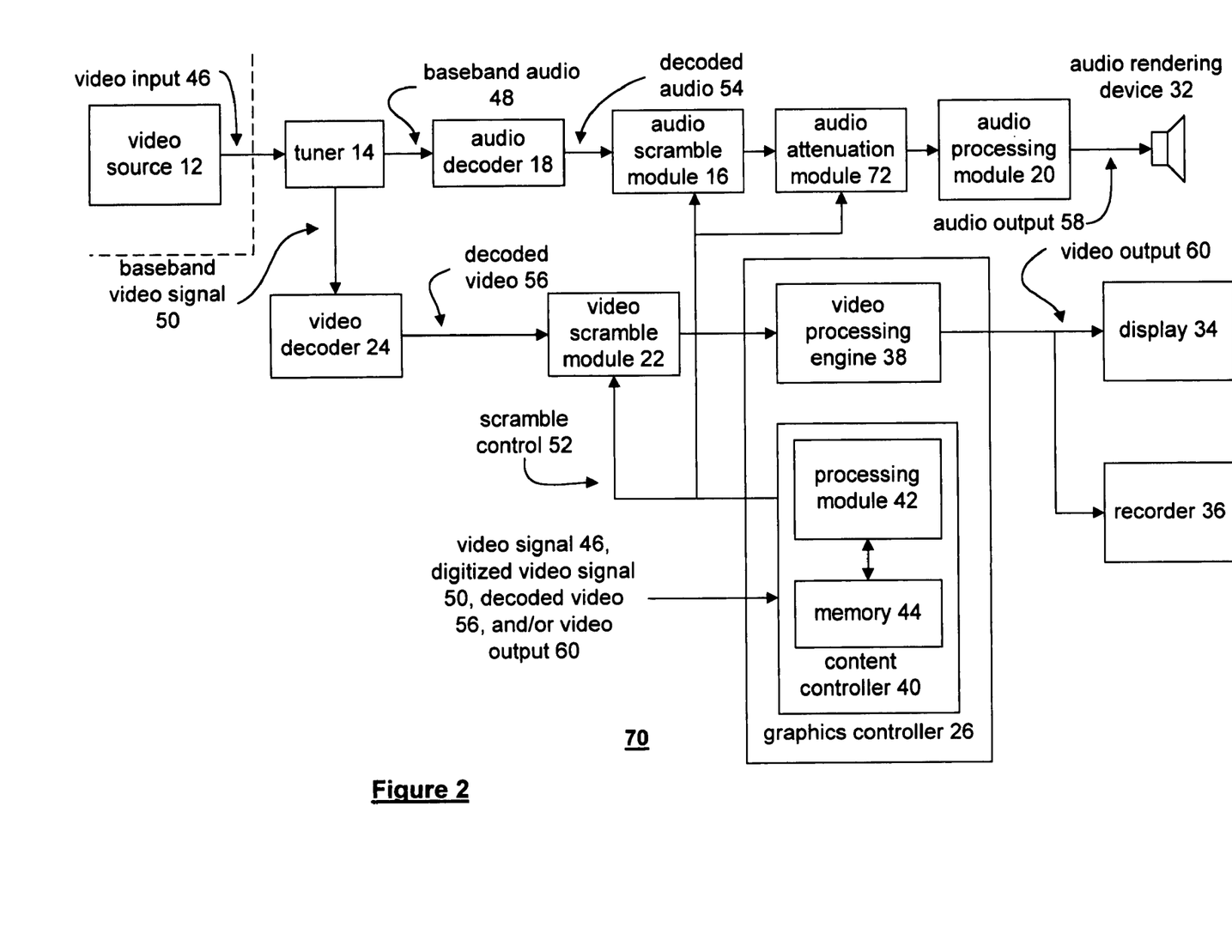
FIG. 2 illustrates a schematic block diagram of an alternate computing system in accordance with the present invention.

FIG. 2 illustrates a schematic block diagram of an alternate computing system 70 in accordance with the present invention. In this embodiment, the computing system 70 includes the audio scramble module 16 coupled to the output of the audio decoder 18. In addition, the video scramble module 22 is coupled to the output of the video decoder 24 or to the output of the video processing engine 38. In this embodiment, the decoded audio signal 54 is typically an analog signal, such that the audio scramble module 16 operates in the analog domain. Similarly, the video scramble module 22 may be acting upon an analog representation of the video 60, or, if the display is a digital display, acting upon a digital representation of the video 60. As such, as shown in FIGS. 1 and 2, the audio scramble module 16 and the video scramble module 22 may be digital and/or analog devices. As one of average skill in the art would appreciate, the video scramble module 22 may further be incorporated as part of the graphics controller and/or within the video processing engine 38, which will be discussed with reference to FIG. 4.

The analog path of the computing system 70 further may include an audio attenuation module 72. In general, if the audio signal is scrambled, it may produce, if unattenuated, an audible signal that would be unpleasant to the user. As such, by including an audio attenuation module 72, which is activated based on the scramble control signal 52, the scramble audio signal may be have reduced volume.

Figure 3:
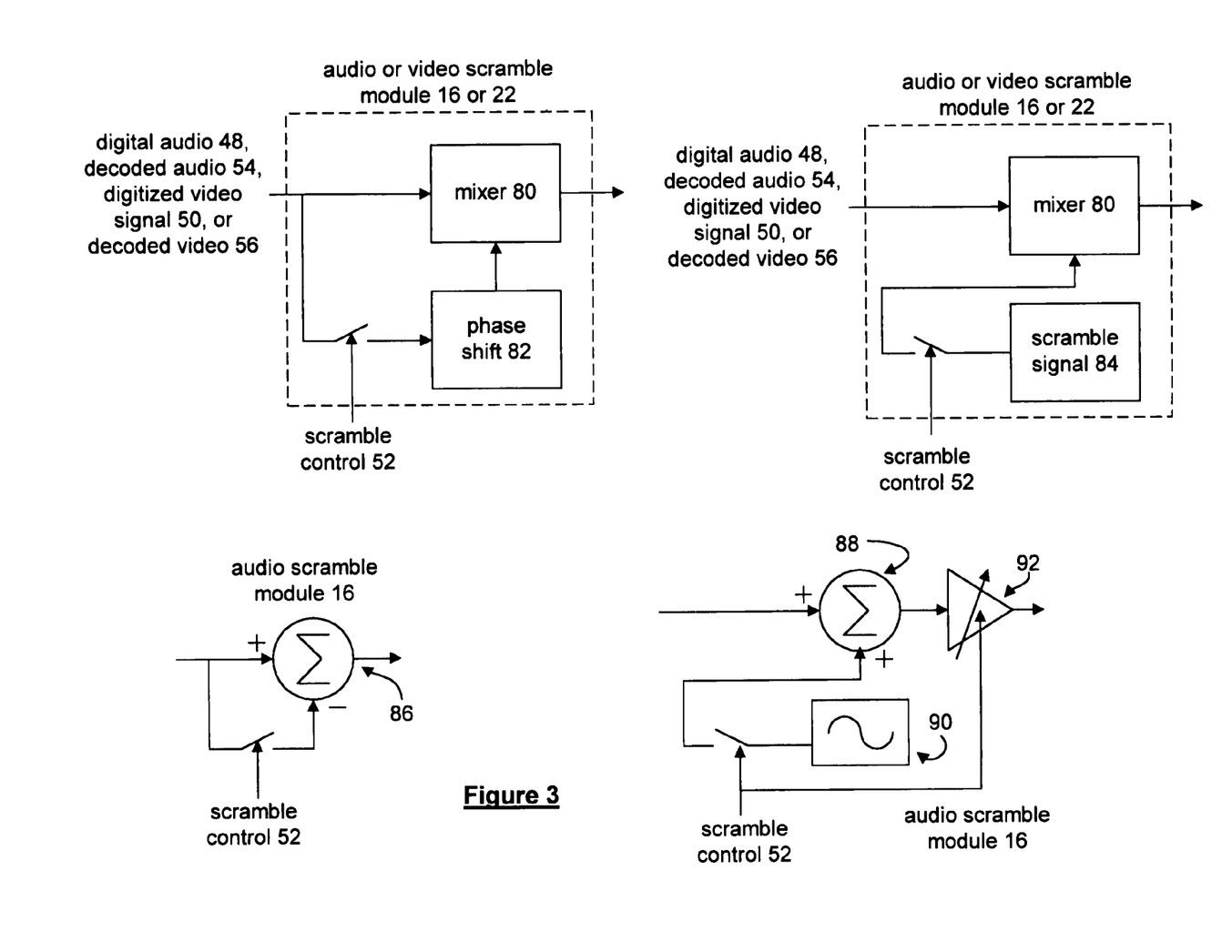
FIG. 3 illustrates schematic block diagrams of an audio and video scrambler in accordance with the present invention.

FIG. 3 illustrates several schematic block diagrams of the audio and/or video scramble module 16 and 22. In the first embodiment, the scramble module 16 or 22 includes a digital mixer 80 that is operably coupled to receive the digital audio signal 48, the decoded audio 54, the digitized content signal 50, or the decoded video 56. The scramble module further includes a digital phase shift module 82 operably coupled to also receive the input of the mixing signal. The phase shift module 82 shifts the signal (e.g., by 180 degrees +/− 90 degrees), which is mixed with the original signal when the scramble control signal 52 is active. As such, when the scramble control signal 52 is active the mixer 80 is mixing the input signal with a phase shifted representation of the input signal thereby producing a scrambled output.

As an alternate scramble module 16 or 22, the mixer 80 is operably coupled to receive the corresponding digital input signal and also to receive a scramble signal via scramble module 84. When the scramble control signal 52 is active, the scramble signal is provided to the mixer 80. The scramble signal may be generated as a random number generator, based on the digital input signal, or any other scrambling technique that would produce a video output that is unintelligible.

An analog audio scramble module 16 is also shown to include a summing module 86 that is operably coupled to receive an audio analog input and a phase shifted representation thereof when the scramble control signal 52 is active. As such, by subtracting a phase shifted analog representation of the analog signal from the analog signal the resulting output is sufficiently scrambled to render the audio outputs unintelligible.

FIG. 3 further shows an analog audio scramble module 16 that includes a mixing node 88, an attenuation module 92 and a scramble signal generator 90. When the scramble control signal 52 is active, the scramble signal generator 90, which may produce a sinusoidal signal, is mixed with the analog input by mixer 88. The unintelligible output may be attenuated via the attenuation module 92. The attenuation module may be linearly controlled by the scramble control signal or function in an off/on mode as controlled by the scramble control signal 52.

Figure 4:
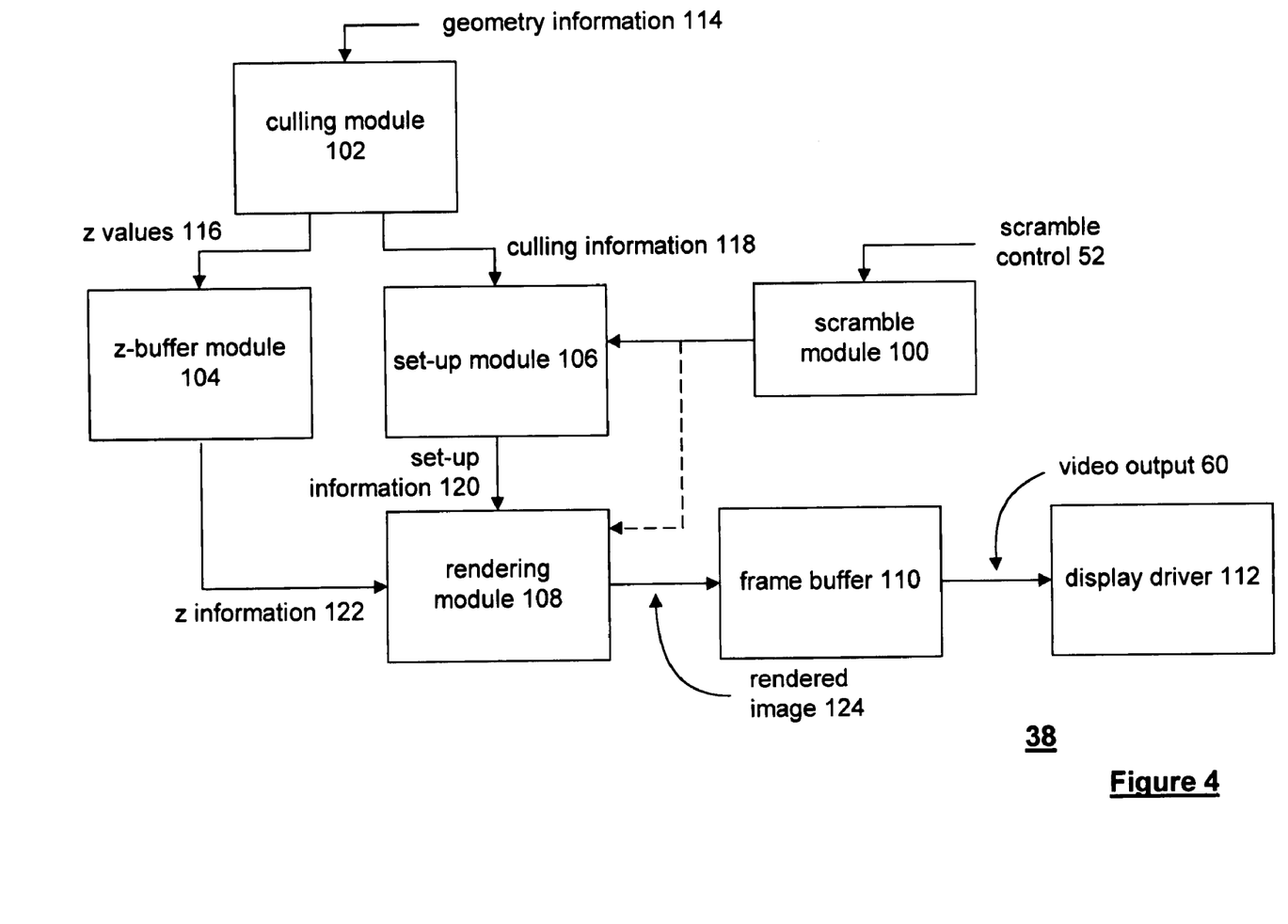
FIG. 4 illustrates a schematic block diagram of a video graphics engine in accordance with the present invention.

FIG. 4 illustrates a schematic block diagram of the video processing engine 38 that may be used for a two dimensional pipeline process and/or a three dimensional pipeline process. The video processing engine 38 includes a culling module 102, a Z buffer module 104, a set up module 106, a scramble module 100, a rendering module 108, and a frame buffer 110. The output of the frame buffer 110 provides the video output 60 to a display driver 112. The culling module 102 is operably coupled to receive geometric information 114 regarding the content signals to be displayed. From this information, the culling module produces Z values 116 and culling information 118. The Z values 116 are processed by the Z buffer module 104 and outputted as Z information 122. The culling information 118 is processed by the setup module 106 to produce setup information 120. The rendering module 108 is operably coupled to receive the Z information 122 and the setup information 120 and produces therefrom rendered images 124. The rendered images are then stored in the frame buffer 110 and subsequently provided to a display via a display driver 112.

the scramble module 110 is operably coupled to the setup module 106 and/or the rendering module 108. When coupled to the setup module 106, the scrambling module 100, when activated via the scrambled control signal 52, provides the setup module with information that causes it to scramble the setup information 120. For example, the scramble information provided to the setup module 106 may alter the physical coordinates of the triangles being rendered and/or the texture coordinates. In addition, the scramble information may alter the color data such that when rendered, the images are unintelligible.

When the scramble module 100 is coupled to the rendering module 108, the scramble information provided to the rendering module 108 may cause the rendered images 124 to be stored in the frame buffer in a random manner. As such, the scramble information provided to the rendering module may be random numbers that are added to subtracted from, or otherwise mathematically used to manipulate the addresses of the frame buffer 110. As such, even though the proper pixel information is being generated, it is scrambled throughout the frame buffer such that the resulting video image is unintelligible. As one of average skill in the art would appreciate, there are numerous ways in which the scramble module may alter the function of the video graphics engine to produce a video output 60 that is unintelligible.

Figure 5:
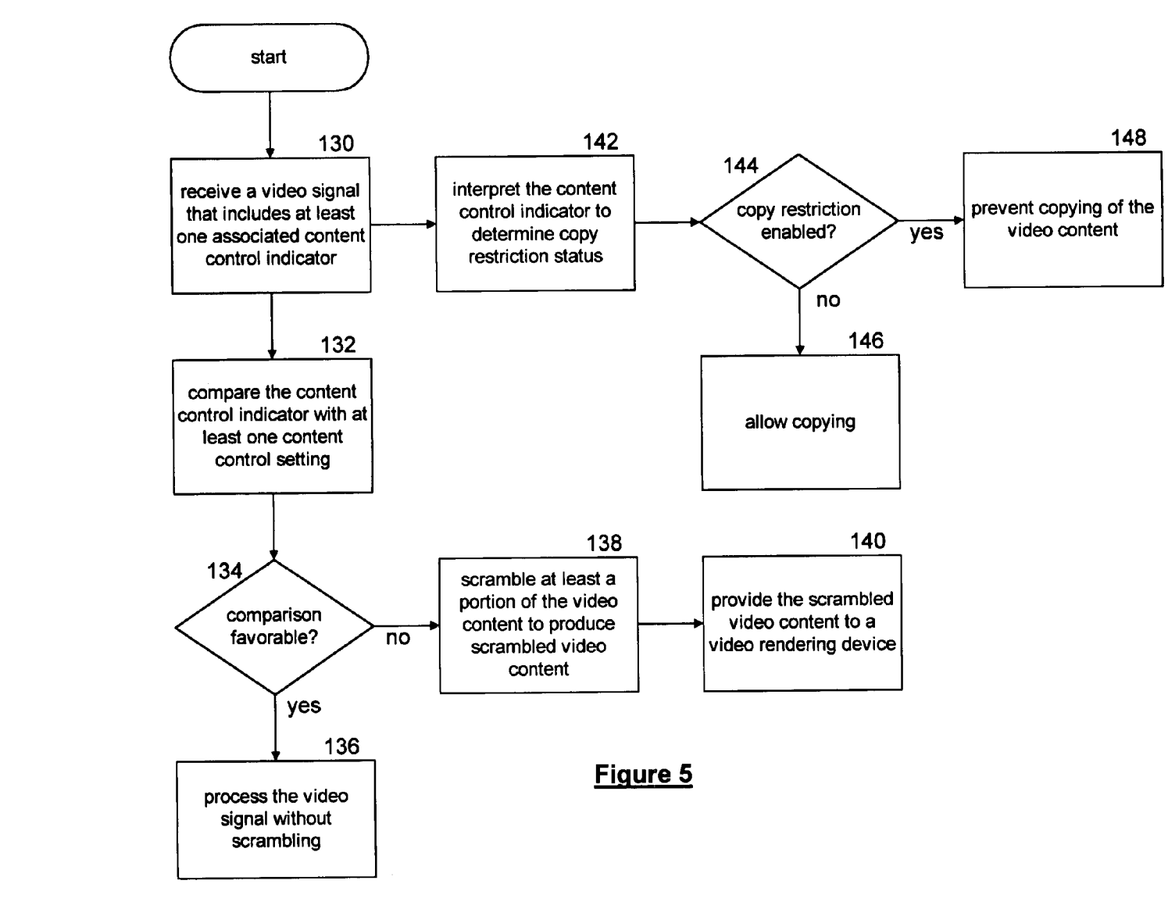
FIG. 5 illustrates a logic diagram of a method for controlling display of content signals in accordance with the present invention.

FIG. 5 illustrates a logic diagram of a method for controlling display of content signals. The process begins at step 130 where a content signal is received, wherein the content signal includes at least one associated content control indicator and video content. Note that the content signal may further include audio content and/or closed captioned content. The process then branches to steps 132 and 142. At step 132, the content control indicator is compared with at least one content control setting, which is provided by the user of the computing system. For example, if the user is a parent trying to regulate the mature content of information that his or her child may view via the computing system, the content control setting would reflect the desired mature nature of the subject matter that the parent wishes his or her child is view.

The process then proceeds to step 134 where a determination is made as to whether the comparison is favorable. A favorable comparison is one in which the content control indicator is at a rating below the content control setting. In other words, the content control indicator indicates that the corresponding video content, audio content, and/or close captioned content is acceptable for unaltered display. If the comparison was favorable, the process proceeds to step 136 where the content signal is processed without scrambling.

If, however, the comparison at step 134 was not favorable, the process proceeds to step 138. At step 138, at least a portion of the video content is scrambled to produce scrambled video content. In addition, if the content signal included audio content it would also be scrambled as well as any corresponding closed captioned content. In addition to scrambling the audio signal, the scrambled audio signal may be attenuated such that the resulting audible output is minimized. As an alternate to scrambling the audio signal, an audio scramble signal may be provided to an audio processing module such that the audio processing module, or audio card, may perform the scramble function. The process then proceeds to step 140 where the scrambled video content, audio content, and/or closed captioned content are provided to the respective video rendering device and/or audio rendering device.

At step 142, the content control indicator is interpreted to determine copy restriction status. Such copy restriction status includes allowing no copying, allowing single copying, or multiple copies. The process then proceeds to step 144 where a determination is made as to whether the copy restriction is enabled. If not, the process proceeds to step 146 where the content signal may be copied. If the copy restriction is enabled, the process proceeds to step 148 where the copying of the video content, audio content and/or close captioned content is prevented.

The proceeding discussion has presented a method and apparatus for controlling display of content signals. By scrambling video content, audio content, and/or close caption content, when a corresponding content control indicator compares unfavorably to a user content control setting, control of the displaying of objectionable material is obtained. In addition, by utilizing a scrambling technique, the video graphics circuitry functions in a similar manner to produce a scramble output and/or the unscrambled output. Thus, minimal additional circuitry is required to achieve parental control.

What is claimed is:

1. A method for controlling display of content signals, the method comprises the steps of:
   a) receiving a content signal in a graphics controller, the content signal includes at least one of video, audio, and text content and at least one associated content control indicator;
   b) comparing the at least one associated content control indicator with at least one content control setting;
   c) receiving the content signal in a tuner;
   when the at least one associated content control indicator compares unfavorably to the at least one content control setting:
   d) generating a scramble control signal in the graphics controller;
   e) providing the scramble control signal to at least one of a video scrambler and an audio scrambler;
   f) scrambling at least a portion of the at least one of video, audio, and text content to produce scrambled content in the graphics controller; and
   g) providing the scrambled content to a content rendering device.

2. The method of claim 1 further comprises:
   scrambling at least a portion of the audio content to produce scrambled audio content, wherein the content signal includes the audio content; and
   providing the scrambled audio content to an audio rendering device.

3. The method of claim 2 further comprises attenuating the at least a portion of the audio content to produce the scrambled audio content.

4. The method of claim 1 further comprises:
   scrambling the text content to produce scrambled text content, wherein the content signal includes the text content; and
   providing the scrambled text content to a display.

5. The method of claim 1 further comprises:
   interpreting the at least one associated content control indicator to determine copy restriction status; and
   when copy restriction is enabled, preventing copying of the content signal.

6. The method of claim 1 further comprises:
   providing an audio scrambling signal to an audio processing module when the at least one associated content control indicator compares unfavorably to the at least one content control setting.

7. A content controller comprises:
   a processing module; and
   memory operably coupled to the processing module, wherein the memory stores operational instructions that cause the processing module to (a) receive a content signal in a graphics control module, the content signal includes at least one of video, audio, and text content and at least one associated content control indicator; (b) compare the at least one associated content control indicator with at least one content control setting (c) receive the content signal in a tuning module;
   when the at least one associated content control indicator compares unfavorably to the at least one content control setting; (d) generate a scramble control signal in the graphics control module; (e) scramble at least a portion of the at least one of video, audio, and text content to produce scrambled content in the graphics control module; and (e) provide the scrambled content to a content rendering device.

8. The content controller of claim 7, wherein the memory further comprises operational instructions that cause the processing module to:
   scramble at least a portion of the audio content to produce scrambled audio content, wherein the content signal includes the audio content; and
   provide the scrambled audio content to an audio rendering device.

9. The content controller of claim 8, wherein the memory further comprises operational instructions that cause the processing module to attenuate the at least a portion of the audio content to produce the scrambled audio content.

10. The content controller of claim 7, wherein the memory further comprises operational instructions that cause the processing module to:
    scramble at least a portion of the text content to produce scrambled text content, wherein the content signal includes the text content; and
    provide the scrambled text content to the display.

11. The content controller of claim 7, wherein the memory further comprises operational instructions that cause the processing module to:
    interpret the at least one associated content control indicator to determine copy restriction status; and
    when copy restriction is enabled, preventing copying of the content signal.

12. The content controller of claim 7, wherein the memory further comprises operational instructions that cause the processing module to:
    provide an audio scrambling signal to an audio processing module when the at least one associated content control indicator compares unfavorably to the at least one content control setting.

13. A video device comprises:
    a tuner operably coupled to receive a content signal and to produce, therefrom, a digitized content signal;
    a video decoder operably coupled to received the digitized content signal and to produce, therefrom, decoded video;
    a graphics controller operably coupled to receive the decoded video and to provide, therefrom, a video output, wherein the graphics controller includes:
    a processing module; and
    memory operably coupled to the processing module, wherein the memory stores operational instructions that cause the processing module to (a) monitor at least one of the content signal, the digitized content signal, the decoded video, and the video output, wherein the at least one of the content signal, the digitized content signal, the decoded video, and the video output includes video content and at least one associated content control indicator; (b) compare the at least one associated content control indicator with at least one content control setting;
    when the at least one associated content control indicator compares unfavorably to the at least one content control setting: (c) generating a scramble control signal in the graphics controller; (d) providing the scramble control signal to at least one of a video scrambler and an audio scrambler in the graphics controller; (e) control scrambling of at least a portion of the digitized content signal or the decoded video to produce scrambled video content; and (f) provide the scrambled video content as the video output.

14. The video device of claim 13 further comprises an audio decoder operably coupled to the tuner, wherein the audio decoder decodes digital audio of the content signal to produce decoded audio, and wherein the memory further includes operational instructions that cause the processing module to:

control scrambling of at least a portion of the digital audio or the decoded audio to produce scrambled audio content, such that the scrambled audio content is provided to an audio rendering device.

15. The video device of claim 14, wherein the memory further comprises operational instructions that cause the processing module to control attenuation of the at least a portion of the digital audio or the decoded audio to produce the scrambled audio content.

16. The video device of claim 15 further comprises at least one of: a scramble module and an attenuation module operably coupled to the audio decoder.

17. The video device of claim 13, wherein the memory further comprises operational instructions that cause the processing module to:

control scrambling at least a portion of caused captioned content to produce scrambled closed captioned content, wherein the content signal includes the closed captioned content; and provide the scrambled closed captioned content as part of the video output.

18. The video device of claim 13, wherein the memory further comprises operational instructions that cause the processing module to:

interpret the at least one associated content control indicator to determine copy restriction status; and when copy restriction is enabled, preventing copying of the video content.

19. The video device of claim 13, wherein the memory further comprises operational instructions that cause the processing module to:

provide an audio scrambling signal to an audio processing module when the at least one associated content control indicator compares unfavorably to the at least one content control setting.

20. The video device of claim 13 further comprises at least one of: a display and a recorder, wherein the display and the recorder are operably coupled to receive the video output.

21. The video device of claim 13 further comprises a scramble module operably coupled to scramble, when enabled, the at least a portion of the digitized content signal or the decoded video.

22. The video device of claim 13, wherein the graphics control further comprises a scramble module operably coupled to scramble, when enabled, the at least a portion of the digitized content signal or the decoded video.

* * * * *